United States Patent [19]

Golden

[11] Patent Number: 4,874,334
[45] Date of Patent: Oct. 17, 1989

[54] ELECTRICAL OUTLET POSITIONER

[76] Inventor: Michael D. Golden, 429 Isabella Ter., Corona del Mar, Calif. 92625

[21] Appl. No.: 259,538

[22] Filed: Oct. 18, 1988

[51] Int. Cl.$^4$ ............................................ H01R 13/60
[52] U.S. Cl. ...................................... 439/538; 174/66
[58] Field of Search ....................... 439/535, 536, 538; 220/3.7, 3.8; 174/66

[56] References Cited

U.S. PATENT DOCUMENTS

| | | | |
|---|---|---|---|
| 1,113,092 | 10/1914 | Beugler | 220/3.7 |
| 1,254,641 | 1/1918 | Adam | 220/3.7 |
| 1,862,324 | 9/1928 | Strnad | 220/3.7 |
| 2,039,550 | 5/1936 | Norton | 220/3.6 |
| 2,272,944 | 2/1942 | Hiltz | 220/3.7 |
| 2,738,892 | 3/1956 | Wiesmann | 220/3.3 |
| 2,775,812 | 1/1957 | Mohr | 220/3.8 |
| 2,989,206 | 6/1961 | McAfee | 220/3.7 |
| 3,101,097 | 8/1963 | Murray | 220/3.7 |
| 3,288,910 | 11/1966 | Zerwes | 220/3.7 |
| 4,098,423 | 7/1978 | Marrero | 220/3.6 |
| 4,134,636 | 1/1979 | Kleinatland et al. | 439/535 |
| 4,135,337 | 1/1979 | Medlin | 52/221 |

Primary Examiner—Eugene F. Desmond
Attorney, Agent, or Firm—Walter A. Hackler

[57] ABSTRACT

Electrical fixture positioner apparatus is provided for enabling the mounting of electrical outlets to a wall mounted electrical junction box with an alignment of the electrical outlet face with a wall surface, despite misalignment of a wall mounted electrical junction box within the wall. The apparatus includes a flat plate with an opening therein sized to enable the body of a conventional 110 volt outlet to pass therethrough along with an aligning portion thereon for engaging per portions of the conventional 110 volt outlet and aligning the face of the electrical outlet with the wall surface when the electrical outlet is mounted to the electrical box with screws extending through the two small aligning holes in the flat plate.

6 Claims, 1 Drawing Sheet

ELECTRICAL OUTLET POSITIONER

The present invention generally relates to electrical switch and outlet boxes used in dwellings and office buildings and, more particularly, is directed to an electrical fixture positioner for enabling proper alignment and secure attachment of installed outlets and switches with a covering face plate and surrounding wall.

In general, electrical boxes, sometimes referred to as junction boxes, are attached to the building frame in a conventional manner prior to the finishing of the walls with drywall, plaster and/or paneling, and the like.

Unfortunately, in many instances the installation of the box does not result in an aligned relationship with the finished wall. That is, either due to carelessness of installation, or subsequent twisting of 2×4 studs used in conventional construction, the face of the box is angularly misaligned, or not flush, or both, with the finished wall. The situation is further worsened if the cutout in the drywall or paneling is too large or mispositioned, which often is the case, as a proper sandwich fit of the drywall or paneling between the small projecting ears of the switch or outlet is necessary for secure mounting if the face of the junction box is not flush with the finished wall.

As a result, when switches or outlets are later installed by securing them to the misaligned junction boxes, face portions of the switches or outlets are not aligned, or flush, with the surrounding wall, and/or the switch or outlet cannot be securely screwed to the junction box. This manifests itself to an even greater degree upon the installation of a face plate to the outlet or switch since the face plate fits flush against the wall and the switch, or outlet, then assumes an angled, or cocked, relationship therewith. Such a condition is obviously unsightly and unfortunately creates suspicions of uncraftsmanlike workmanship in other areas of the electrical installation within the home or office building. This defect is seldom corrected in modern building construction as it involves the time-consuming selection and placement of shims, washers or tubular spacers between the junction box and the switch or outlet.

The invention provides for an inexpensive positioner, or adapter, to enable the rapid flush aligned and secure mounting of switches and outlets in junction boxes which are misaligned with the surface walls in which they are mounted.

SUMMARY OF THE INVENTION

Electrical fixture positioner apparatus in accordance with the present invention generally includes a flat plate having a height and width greater than the height and width of an electrical junction box, with the flat plate including means defining an opening therethrough of sufficient size to enable a body of a conventional outlet to pass therethrough. Further, means are provided which define aligning portions of the flat plate for both engaging ear portions of the outlet and aligning the face of the electrical outlet with the wall surface when electrical outlet is mounted to the box with screws extending through holes in the flat plate.

It should be appreciated that there is no screwed attachment to the flat plate of the present invention to the electrical box. Nonetheless, the flat plate not only provides means for aligning the electrical outlet with the wall, but also provides a support base for a later attached face plate.

More particularly, the present invention may include a flat rectangular plate having the same dimensions as a conventional 110 volt electrical switch or outlet receptacle face plate. When aligning the face of the outlet with the surrounding wall, the body of the conventional 110 volt outlet, or switch, is placed in a generally perpendicular relationship with the wall.

In addition, adhesive means may be provided and disposed on one side of the flat rectangular plate for adhering the flat rectangular plate to the wall. In this manner, means are provided for concealing the flat plate. Since the latter, having the same dimensions as the face plate, is exposed only along peripheral edges thereof and the adhesive means enables the adherence of the flat plate to the wall, insitu painting of the edge of the flat plate is enabled. During painting of the surrounding wall, the face plate may be removed therefrom. Hence, although the flat plate is mounted exterior to the wall, its only exposure is a thin edge painted the same color as the surrounding wall. Since the dominant feature of the resulting installation is then the face plate, the flat plate is effectively concealed.

The present invention may also include an electrical fixture having a face and a body with two opposing ears extending therefrom and screw means for attaching the electrical fixture to an electrical junction box mounted within a wall. In addition, a face plate having means defining at least one opening thereinto to enable access to the face of the electrical fixture may be provided.

The adhesive also provides means for enabling the placement of the electrical fixture without removing of the flat plate from its aligning position against the wall.

BRIEF DESCRIPTION OF THE DRAWINGS

A better understanding of the present invention may be had from the consideration of the following detailed description, taken in conjunction with the accompanying drawings, in which.

DETAILED DESCRIPTION

Figure 1:
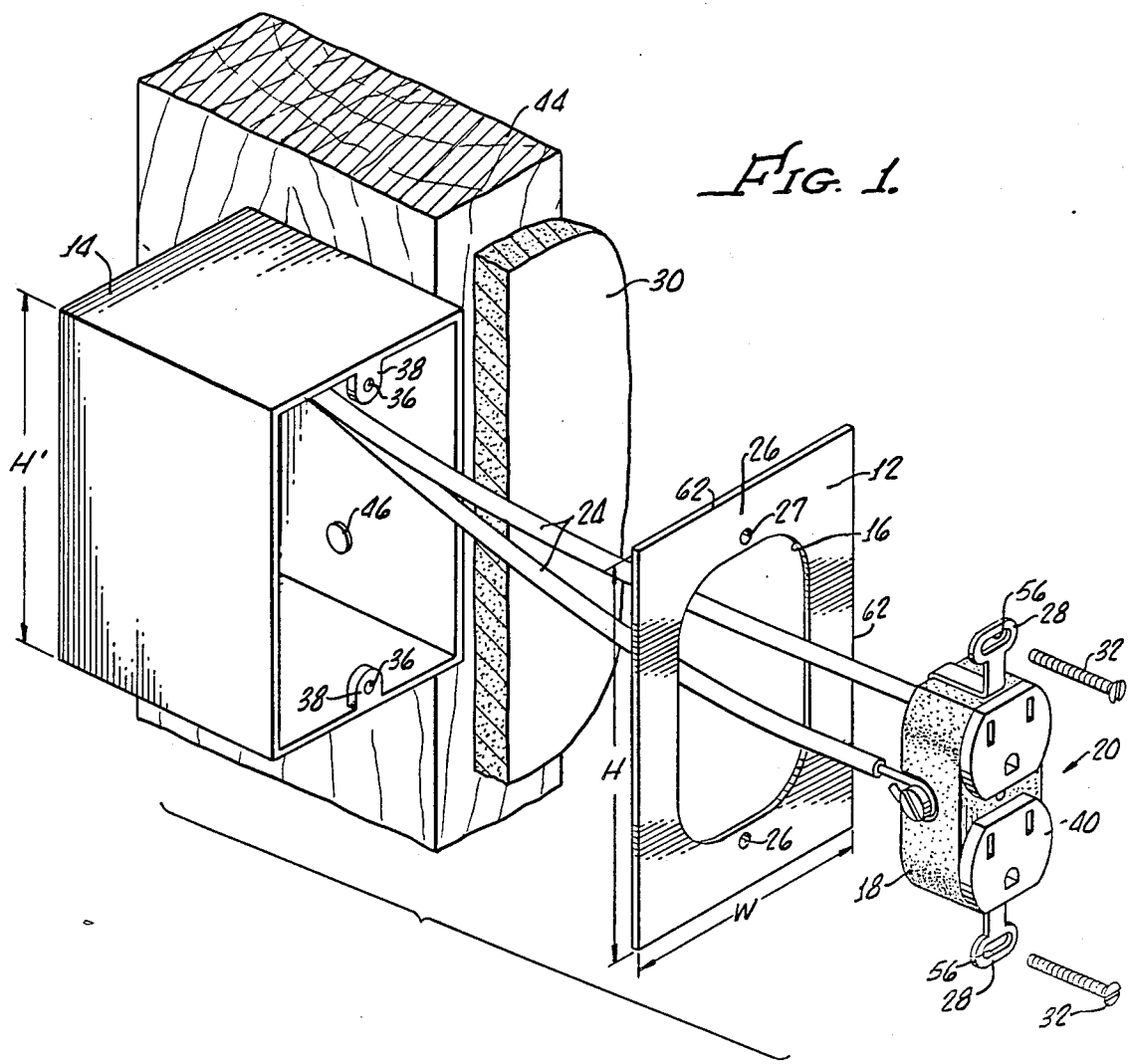
FIG. 1 is a perspective view of the electrical fixture positioner apparatus in accordance with the present invention shown in an exploded manner showing its relative position between an electrical outlet and a junction box.

Turning now to FIG. 1, there is shown an electrical fixture positioner apparatus 10 generally including a flat rectangular plate 12 having a height H and a width W generally greater than the corresponding height H' and width W' of a conventional 110 volt electrical junction box 14. It should be appreciated that the apparatus 10 is illustrated herein for use with the single gang junction box 14, however, it is also suitable for multiple gang junction boxes (not shown) with corresponding height and width dimension therefor. The plate 12 generally includes an opening 16 therethrough of sufficient size to enable the body 18 of a conventional 110 volt outlet 20 or switch 22 (see FIG. 2) to pass therethrough and is formed from a structural non-conductive material, such as reinforced plastic.

This feature enables the installation of the position 10 without disconnecting wires 24 attached to the outlet 20. For safety, power should be disconnected when the positioner 10 is installed but no wiring connection need be disturbed. This will be found convenient to an inexperienced lay person unfamiliar with electrical wiring.

Aligning portions 26 with holes 27 of the flat plate 12 provide means for engaging ear portions 28 of the electrical outlet 20 for aligning the body 18 of the outlet 20 in a generally perpendicular relationship with a wall surface 30 when the outlet 20 is mounted to the box 14 with screws 32 passing through the opening 16 and into appropriately spaced apart and tapped holes 36 in projecting portions 38 of the junction box 14.

The flat plate 12 of the electrical fixture positioner apparatus 10 is particularly suited for the alignment of an outlet face 40 (FIG. 1) or a switch face 42 (FIG. 2) in a generally flush or parallel arrangement with the wall surface 30 even though the box 14 may be misaligned or at an angle A with the wall surface 30 which is either caused by careless installation or the twisting of a stud 44 to which it may be attached by nails 46, or the like.

Figure 2:
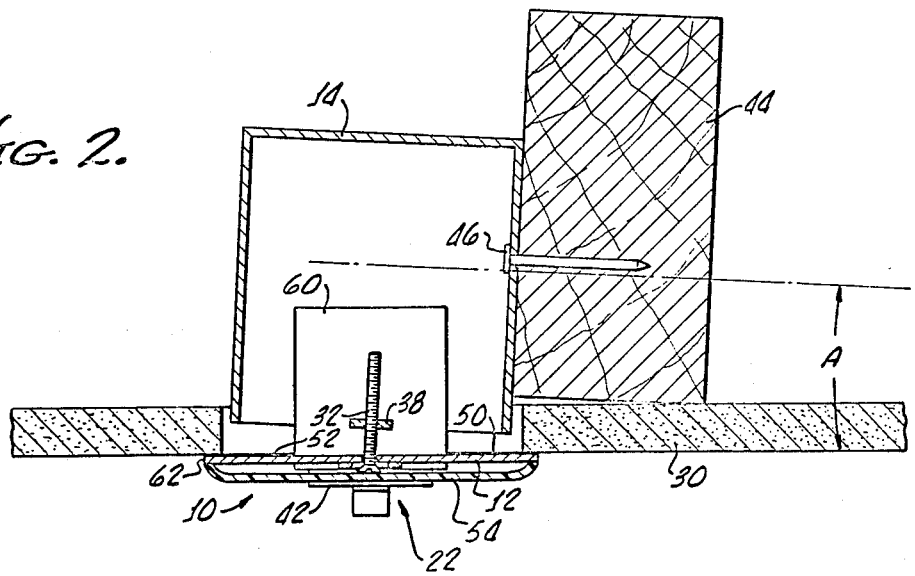
FIG. 2 is a cross-sectional view of the electrical fixture positioner apparatus according to the present invention showing it installed with an electrical fixture to a misaligned junction box and also showing the manner in which it aligns the electrical fixture to a surrounding wall.

In operation, the face plate 12 is positioned on the wall surface 30 and it may be held in position against the wall surface independent of the receptacle outlet 20, or switch 22, by any suitable adhesive 50 disposed on a back side 52 of the plate 12. The plate may have a height and width, H, W, equal to that of a conventional face plate 54 in order that it may be concealed thereunder, as later described in greater detail. When in position, the plate 12 enables the fastening of the outlet of switch to the junction box 14 by means of screws 32. Because holes 56 in the outlet ears 28 enable the twisting of the screws therein, the plate 12 can maintain alignment of the outlet body 18, or switch body 60, so that the outlet face 40 or switch face 42 is generally parallel with the wall surface 30 as shown in FIG. 2.

It should be pointed out that the present invention is ideally suited for remodeling of homes and/or offices where paneling has been installed over existing walls because flush mounting of the outlet or switch face 40, 42 is enabled.

Importantly, the adhesive 50 enables the outlet 20 or switch 22 to be removed from the receptacle and extend therefrom by wires 24, not shown, to facilitate painting edge portions 62 of the plate along with the wall surface 30. Consequently, upon reassembly, the only exposure of the plate is the edge 62, which, being the same color as the wall surface 30, effectively conceals the plate 12. Alternatively, the plate 12 may be manufactured using material of the same color as the face plate thus concealing its presence.

Although there has been described hereinabove a specific arrangement of an electrical fixture positioner apparatus in accordance with the present invention for purposes of illustrating the manner in which the invention may be used to advantage, it should be appreciated that the invention is not limited thereto. Accordingly, any and all modifications, variations or equivalent arrangements, which may occur to those skilled in the art, should be considered to be within the scope of the invention as defined in the appended claims.

What is claimed is:

1. Positioner apparatus for a wall mounted electrical fixture comprising, in combination:
    a conventional faceplate for a 110 volt outlet or switch;
    a flat rectangular plate having outside dimensions equal to that of the conventional faceplate, said flat rectangular plate comprising:
    means defining an opening through said flat rectangular plate of sufficient size to enable a body of a conventional 110 volt outlet or switch to pass therethrough;
    means defining aligning portions of the flat rectangular plate for both engaging ear portions of said conventional 110 volt outlet or switch and aligning the body of the conventional 110 volt outlet or switch in a perpendicular relationship with a wall despite the orientation of the electrical box with the wall and without intrusion of the flat rectangular plate into said electrical box or wall when said conventional 110 volt outlet or switch is mounted to the electrical box; and
    means for causing vertical alignment of the flat rectangular plate with the conventional faceplate and enabling horizontal alignment of the flat rectangular plate with the conventional faceplate when said conventional faceplate is attached to the conventional 110 volt outlet or switch, said last mentioned means comprising means defining a pair of holes in a spaced apart relationship in said flat rectangular plate for enabling the mounting of said conventional outlet or switch to said electrical box by screws extending through the flat rectangular plate holes.

2. The electrical fixture positioner apparatus according to claim 1 further comprising adhesive means disposed on one side of said flat rectangular plate for adhering said flat rectangular plate to the wall.

3. The electrical fixture apparatus of claim 2 wherein the electrical fixture is a conventional 110 volt electrical outlet.

4. The electrical fixture apparatus according to claim 3 further comprising means for enabling replacement of said electrical fixture without removal of the flat plate from its aligning position against the wall.

5. The electrical fixture apparatus according to claim 4 wherein said means for enabling replacement of said electrical fixture comprises adhesive means disposed on one side of the flat plate for adhering the flat plate to the wall, adhesion occurring when the electrical fixture is mounted to the electrical junction box with the screw means.

6. Positioner apparatus for a wall mounted electrical fixture comprising:
    an electrical fixture having a face and a body with two opposing ears extending therefrom;
    screw means for attaching the electrical fixture to an electrical junction box mounted within a wall;
    a faceplate having means defining at least one opening therein to enable access to the face of the electrical fixture;
    a flat plate having the same exterior outline as the faceplate, said flat plate including means defining an opening therethrough of sufficient size to enable the electrical fixture body to pass therethrough, and means defining aligning portions of the flat plate for both engaging the electrical fixture ears and aligning the electrical fixture face in a generally flush relationship with the wall, despite the orientation of the electrical box with the wall and without intrusion of the flat plate into the electrical junction box or wall; and means for causing vertical alignment of the flat plate with the faceplate and enabling horizontal alignment of the flat plate with the faceplate when said faceplate is attached to the electrical fixture, said last mentioned means comprising means defining a pair of holes in a spaced apart relationship in said flat rectangular plate for enabling the mounting of said electrical fixture to said electrical junction box by extending the screw means through the flat rectangular plate holes.

* * * * *